US009291209B2

(12) United States Patent
Sueoka et al.

(10) Patent No.: US 9,291,209 B2
(45) Date of Patent: Mar. 22, 2016

(54) ROTATION CLAMPING MECHANISM

(71) Applicant: HIRATA CORPORATION, Shinagawa-ku (JP)

(72) Inventors: Hisayuki Sueoka, Shinagawa-ku (JP); Yasuhiko Wakatsuki, Shinagawa-ku (JP); Hideto Maeda, Shinagawa-ku (JP); Hiroaki Matsumoto, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 0 days.

(21) Appl. No.: 14/318,214

(22) Filed: Jun. 27, 2014

(65) Prior Publication Data

US 2015/0001029 A1   Jan. 1, 2015

(30) Foreign Application Priority Data

Jun. 27, 2013   (JP) .................................. 2013-135653

(51) Int. Cl.
| *F16D 11/16* | (2006.01) |
| *F16D 11/12* | (2006.01) |
| *G01M 15/04* | (2006.01) |
| *G01M 15/02* | (2006.01) |

(52) U.S. Cl.
CPC ................ *F16D 11/12* (2013.01); *F16D 11/16* (2013.01); *G01M 15/02* (2013.01); *G01M 15/04* (2013.01)

(58) Field of Classification Search
CPC .... F16D 11/16; F16D 2125/28; G01M 15/00; G01M 15/04
See application file for complete search history.

(56) References Cited

U.S. PATENT DOCUMENTS

| 3,224,701 | A |   | 12/1965 | Wynne |
| 3,760,919 | A | * | 9/1973  | Gilsinger .................... 192/89.21 |
| 3,938,634 | A | * | 2/1976  | Frost ............................ 192/56.3 |
| 4,277,972 | A | * | 7/1981  | Wolschlager .............. 73/862.16 |
| 4,779,475 | A | * | 10/1988 | Irikura et al. .................... 74/371 |

FOREIGN PATENT DOCUMENTS

| GB | 399907 A    | 10/1933 |
| JP | 05-113388 A | 5/1993  |

OTHER PUBLICATIONS

Communication and European Search Report dated Nov. 16, 2015 issued in the corresponding European Patent Application No. 14174695.8 (7 pages).

* cited by examiner

*Primary Examiner* — Richard Lorence
*Assistant Examiner* — David Morris
(74) *Attorney, Agent, or Firm* — Buchanan Ingersoll & Rooney PC

(57) ABSTRACT

A rotation clamping mechanism includes a rotating member and at least two engagement members that are attached to the rotating member and transmit rotational power. The engagement members engage a rotated object placed in a predetermined positional relationship with the engagement members. The rotated object is rotated by rotating the rotating member. The engagement members are supported on the rotating member so as to swing to an engagement position where power is transmitted to the rotated object and to a release position where engagement is released. The rotation clamping mechanism further includes: an opening/closing mechanism that moves the engagement members between the engagement position and the release position; and a biasing member that biases the engagement members toward the engagement position. At the engagement position, the engagement members clamp the rotated object in a floating state with the engagement members pressed onto the rotated object by the biasing member.

10 Claims, 6 Drawing Sheets

ROTATION CLAMPING MECHANISM

FIELD OF THE INVENTION

The present invention relates to a rotation clamping mechanism (connecting mechanism) that transmits rotational power from a rotational driving apparatus to a rotated object, and in particular to a rotation clamping mechanism installed on a rotational driving apparatus.

DESCRIPTION OF THE RELATED ART

A rotational shaft coupling apparatus (see Patent Document 1) is one example of a rotational driving apparatus that clamps a rotated object and transmits rotational power. Such coupling apparatus is used in a cold test apparatus for a completed engine (internal combustion engine). A cold test apparatus uses a coupling apparatus to connect a motor of the test apparatus to a gear (for example, the drive plate) of a rotational shaft of the engine to be tested, and forcibly drives the engine using a motor to carry out various performance tests on the engine.

In more detail, the coupling apparatus described above is equipped with a meshing portion 13 that meshes with the gear of a rotational shaft, and is a construction where unbalanced weights 18c are provided on meshing hook portions 18 provided on the meshing portion 13 (see FIG. 1 of Patent Document 1).

When carrying out a cold test using this cold test apparatus, first, the meshing hook portions 18 are positioned so as to mesh with the gear of the rotational shaft of the engine and then the motor is driven to rotate the meshing portion 13. When this happens, the meshing hook portions 18 of the meshing portion 13 and the unbalanced weights 18c rotate, and due to the centrifugal force of the unbalanced weights 18c, the meshing hook portions 18 are pressed against the gear so that the rotational shaft of the engine is clamped on the meshing portion 13. At the same time, the rotational shaft of the engine starts rotating state, which makes testing possible.

[Patent Document 1] Japanese Laid-Open Patent Publication No. H05-113388

SUMMARY OF THE INVENTION

However, with a construction where a coupling apparatus and the gear are coupled by clamping the rotational shaft of the engine using the meshing portion 13 of the coupling apparatus, it is not always easy to align the axis of the rotational shaft of the meshing portion 13 and the axis of the rotational shaft of the engine, and in some cases the two devices will be coupled in a state where the axis positions are misaligned.

If such misalignment occurs, variations will be produced in the opening/closing angles (i.e., the angle of inclination of a meshing hook portion 18 to the rotational shaft) of the plurality of meshing hook portions 18, resulting in variations in the distance from the rotational shaft to the center of gravity position of each meshing hook portion 18. If such variations are present, the clamping force applied from a meshing hook portion 18 to the gear will vary between individual meshing hook portions 18. The clamping force applied to the gear from the respective meshing hook portions 18 will also change from moment to moment. This means that if the misalignment described above occurs, vibration is likely to occur when the meshing portion 13 is rotated. In particular, since the meshing portion 13 of the coupling apparatus described above is equipped with the unbalanced weights 18c that are heavy, variations in the center of gravity position easily occur, which makes vibration likely. Since vibration of the meshing portion 13 is transmitted via the meshing hook portions 18 to the engine as noise, this adversely affects the measurement precision of the cold test of the engine.

The present invention was conceived in view of the problems described above and aims to provide a rotation clamping mechanism constructed so as to be capable of suppressing the occurrence of vibration at the rotational driving apparatus more reliably, regardless of the state in which the rotational driving apparatus and the rotated object are connected.

One aspect of the present invention is a rotation clamping mechanism including: a rotating member installed so as to be capable of being rotationally driven; and engagement members that are attached to the rotating member and transmits rotational power, wherein the engagement members are placed in engagement with a rotated object placed at a power transmission implementation position, which is in a predetermined positional relationship with the engagement members, and the rotated object is rotated by rotating the rotating member, at least two engagement members are attached to the rotating member, the engagement members are supported on the rotating member in state where the engagement members are capable of swinging to an engagement position where there is engagement whereby it is possible to transmit power to the rotated object and to a release position where the engagement is released, the rotation clamping mechanism further includes: an opening/closing mechanism that opens and closes the engagement members between the engagement position and the release position; and a biasing member that biases the engagement members toward the engagement position, and when positioned at the engagement position, the plurality of engagement members clamp the rotated object in a floating state where the engagement members are pressed onto the rotated object by the biasing member.

A biasing direction of the biasing member may be a direction perpendicular to an axial direction of a rotational axis of the rotating member, and a swinging plane of each engagement member may be a plane formed by a biasing direction of the biasing force applied to the engagement member and the axial direction of the rotational axis.

The opening/closing mechanism may include a pressing member that slidably contacts a sliding surface of the engagement member, the pressing member may apply a pressing force that resists the biasing force of the biasing member to the engagement members and may be capable of moving between a pressing position that positions the engagement members at the release position and a withdrawal position where the pressing member is separated from the engagement members, and the engagement members positioned at the engagement position may be pressed onto the rotated object in a floating state by the biasing force of the biasing member.

Also, a swinging axis position of each engagement member may be a midway position between a contact position of the engagement member on the rotated object and a contact position of the biasing member on the engagement member, and may be disposed so as to be offset toward the contact position between the biasing member and the engagement member from a midway position that is equidistant from both contact positions.

The biasing member may be disposed so that the contact position with each engagement member in the biasing direction is positioned closer to the rotational axis than the swinging axis position of the biasing member.

Another aspect of the present invention is a rotation test apparatus for an internal combustion engine including a rotation clamping mechanism that rotates a drive plate of an internal combustion engine loaded at a predetermined position, the rotation clamping mechanism including: a rotating member installed so as to be capable of being rotationally driven; and engagement members that are attached to the rotating member, wherein the engagement members transmit rotational power from the rotating member to the drive plate, with at least two engagement members being attached to the rotating member, the engagement members are supported on the rotating member in state where the engagement members are capable of swinging to an engagement position where there is engagement whereby it is possible to transmit power to the drive plate and to a release position where the engagement is released, the rotation test apparatus is configured so that the drive plate rotates when the engagement members are placed in engagement with the drive plate and the rotating member is rotated, the rotation clamping mechanism further includes: an opening/closing mechanism that opens and closes the engagement members between the engagement position and the release position; and a biasing member that biases the engagement members toward the engagement position, and when positioned at the engagement position, the plurality of engagement members clamp the drive plate in a floating state where the engagement members are pressed onto the drive plate by the biasing member.

With the rotation clamping mechanism according to the present invention, since a rotated object is clamped by a plurality of engagement members that are in a floating state, when the rotated object is rotated, the generation of vibration at the rotation clamping mechanism is suppressed more reliably. That is, even if the contact positions between the engagement members and the rotated object fluctuate when the rotated object is rotated, such fluctuations can be flexibly handled by the rotated object swinging with respect to the rotating member, which means that the shaking at the contact positions between the engagement members and the rotated object is prevented.

PREFERRED EMBODIMENTS OF THE INVENTION

Next, embodiments of a rotation clamping mechanism according to the present invention will now be described.

A rotation clamping mechanism 1 (see FIG. 1) according to the present embodiment is used by a cold test apparatus for an engine (i.e., a testing apparatus for internal combustion engines). The cold test apparatus includes an engine loading portion (not shown) that is installed on an apparatus base portion, also not shown, and the rotation clamping mechanism 1, and is an apparatus for carrying out various tests on an engine by rotating a drive plate B (rotated object) of the engine, which has been loaded at a predetermined test position (power transmission implementation position) on the engine loading portion, using the rotation clamping mechanism 1.

Figure 1:
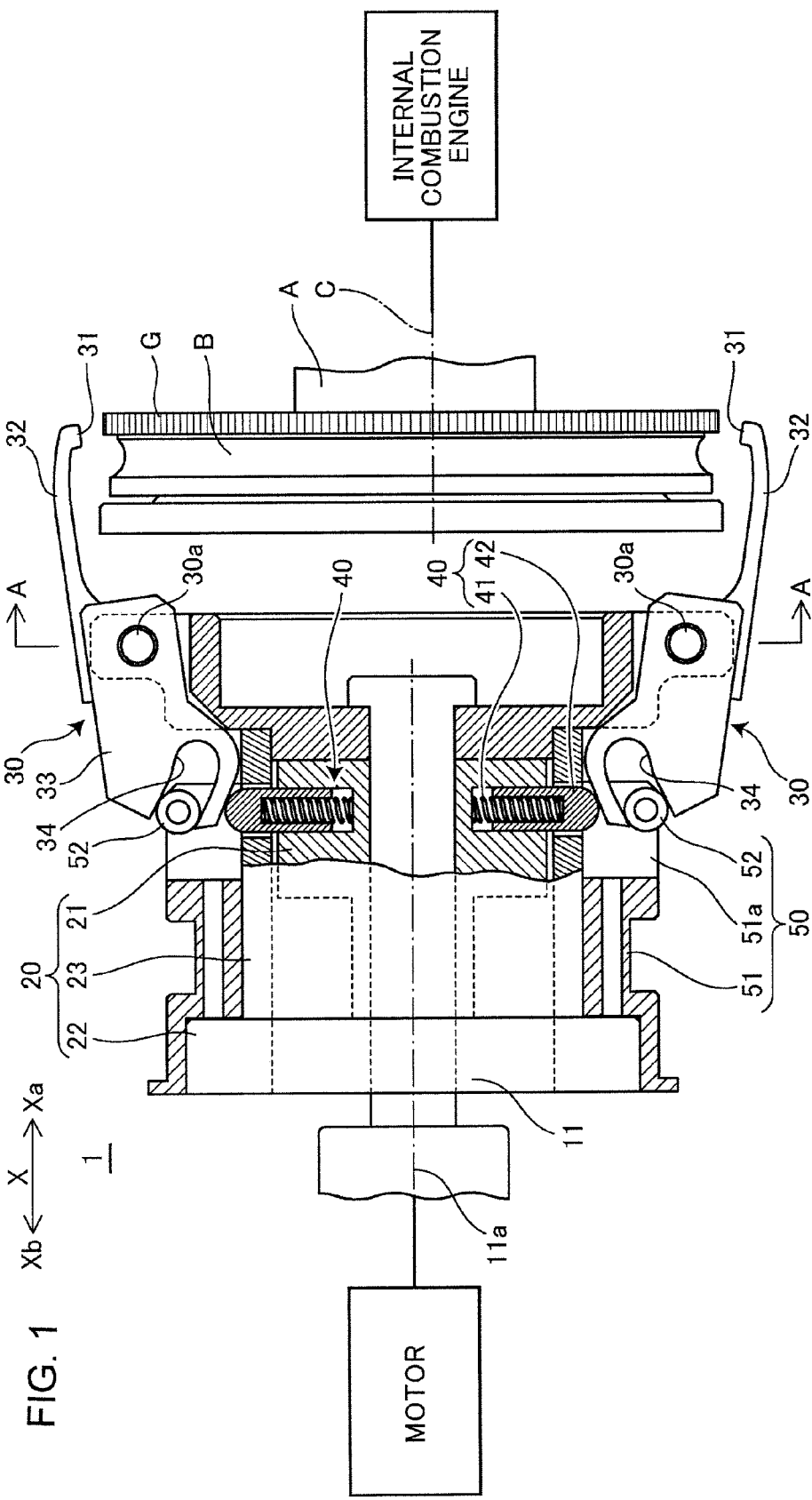
FIG. 1 is a cross-sectional view showing a rotation clamping mechanism according to an embodiment of the present invention, taken along a plane C-C (in FIG. 4) at a time when engagement members are positioned at a release position.

The rotation clamping mechanism 1 clamps the drive plate B of the engine placed at the test position and, as shown in FIG. 1, is equipped with a rotating member 20 which is fixed to an output shaft portion 11 of a motor installed on the apparatus base portion. Accordingly, when the motor is driven, the output shaft portion 11 rotates around a rotational axis 11a so that the rotating member 20 integrally rotates together with the output shaft portion 11.

The rotating member 20 is equipped with a front end portion 21 fixed to a front end of the output shaft portion 11, a base portion 22 fixed to a base end of the output shaft portion 11, and a sliding portion 23 that is cylindrically shaped and disposed so as to surround the base end of the base portion 22. A slider body 51, described later, that is capable of sliding along an outer circumference of the sliding portion 23 is disposed on the outside of the sliding portion 23. The front end portion 21, the base portion 22, and the sliding portion 23 are integrally assembled using fixing members such as screws 20a to construct the rotating member 20.

The rotation clamping mechanism 1 includes engagement members 30 equipped with hook portions (a first contact portion) 31 that contact the drive plate B that is to be clamped, biasing members 40 that apply biasing forces to the engagement members 30, and cam rollers (pressing members) 52 of the opening/closing mechanism for opening and closing the engagement members 30.

As shown in FIG. 3, each engagement member 30 includes: an arm portion 32 that is supported, at a swinging shaft portion 30a thereof, on the front end portion 21 of the rotating member 20 so as to be capable of swinging and extends from the swinging shaft portion 30a toward the front Xa in a rotational axis direction X; and a tail portion 33 that extends toward the rear Xb from the swinging shaft portion 30a.

The arm portion 32 is equipped, at a front end thereof, with a hook portion 31 that contacts the drive plate B.

The hook portion 31 is formed at a position where the drive plate B is contacted and is provided with a convex and convex form that is capable of engaging a gear G formed on the outer circumference of the drive plate B.

The tail portion 33 includes a biasing surface 33a contacted by a head portion 42 of a biasing member 40, described later, a cam surface (pressing surface) 33b contacted by a cam roller 52, and a cam groove 34 formed so that a front Xa side in the rotational axis direction thereof is downwardly inclined toward the rotational axis 11a. The biasing surface 33a of the tail portion 33 is a surface that is inclined toward the rotational axis at the center of the rotating member 20 (i.e., toward the inside in the radial direction). The cam surface 33b is a surface positioned on the head portion 42 side of the cam groove 34 which the cam roller 52 can be pressed out of, and is an inclined surface that is inclined so as to approach the rotational axis 11a from the rear Xb side in the rotational axis direction toward the front Xa side. Note that the cam surface 33b does not need to be a groove surface inside a groove portion and may be an outer circumferential surface of the tail portion 33.

In this way, the position (swinging axis position) of the swinging shaft portion 30a of each engagement member 30 is disposed at a midway position between the position of the hook portion 31 (the "first contact position") and a second contact position where the head portion 42 of the corresponding biasing member 40 contacts the engagement member 30 (the "biasing position"). In addition, the swinging axis position is disposed at a midway position between the position of the hook portion 31 and the position where the cam roller 52 contacts the engagement member 30.

Each engagement member 30 is capable of swinging between an engagement position, which is a state where the hook portion 31 contacts the drive plate B (see FIG. 2), and a release position (see FIG. 1), which is a state where the engagement is released.

Figure 2:
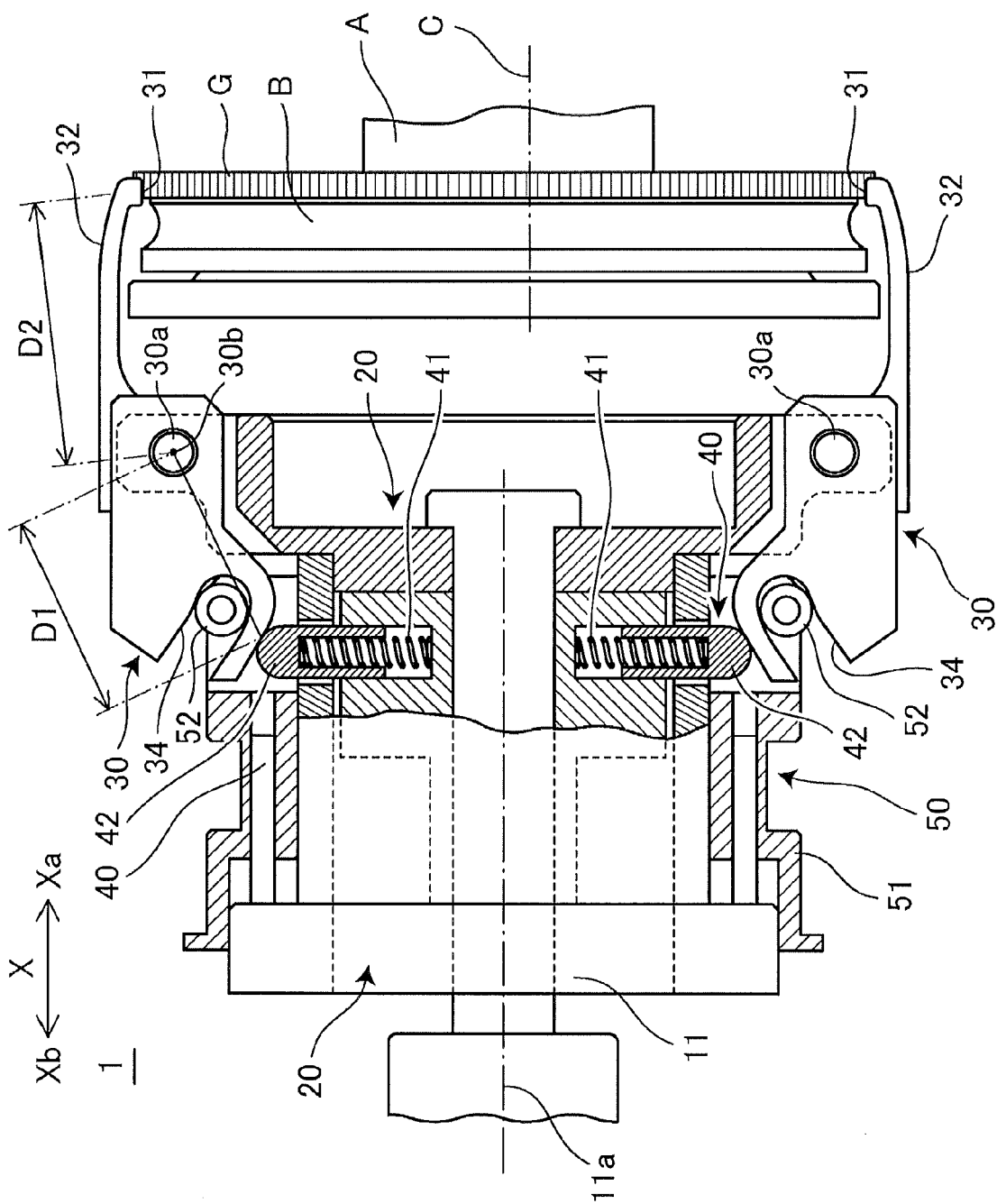
FIG. 2 is a cross-sectional view of the rotation clamping mechanism according to the present embodiment, taken along a plane C-C (in FIG. 4) at a time when the engagement members are positioned at an engagement position.

Each engagement member 30 at the engagement position is in a state where the hook portion 31 engages the gear G of the drive plate B and the drive plate B is clamped by the rotation clamping mechanism 1 (see FIG. 2). If the rotating member 20 is rotated in a state where the drive plate B is clamped, the rotational power of the rotating member 20 will be transmitted via the engagement members 30 to the drive plate B, which makes it possible to rotate the drive plate B. That is, it is possible to drive (i.e., cold test) the engine without supplying fuel to the engine and actually burning the fuel.

On the other hand, each engagement member 30 at the release position is in a state where the hook portion 31 is separated from the drive plate B. In this state, it is possible to load and unload the engine to be cold tested at a predetermined test position.

Figure 3A:
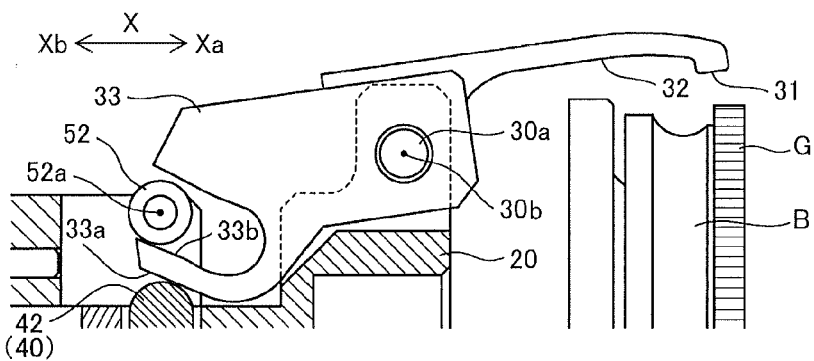
FIGS. 3A to 3D are diagrams useful in explaining the operation of the rotation clamping mechanism according to the present embodiment.
Figure 3B:
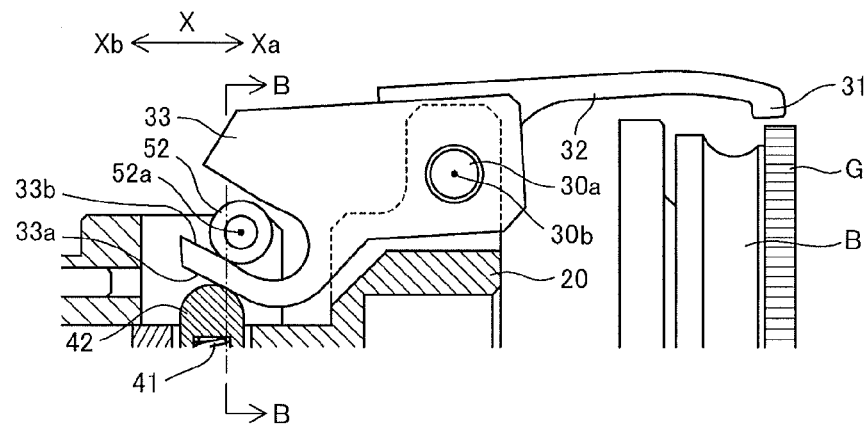
Figure 3C:
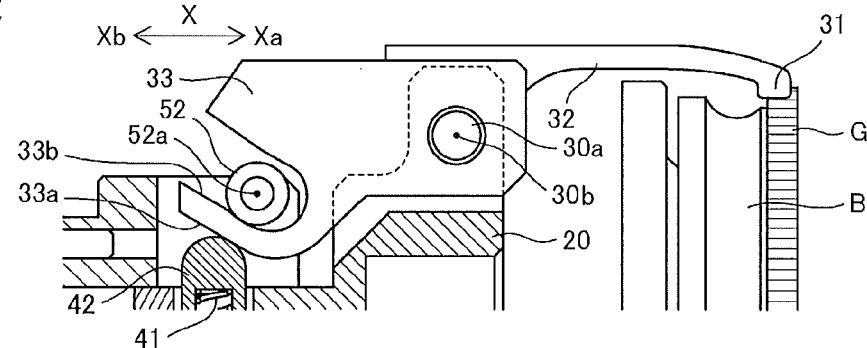
Figure 3D:
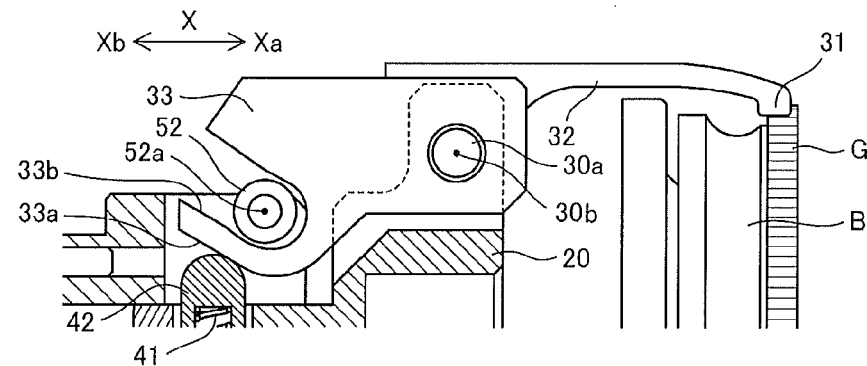
Figure 4:
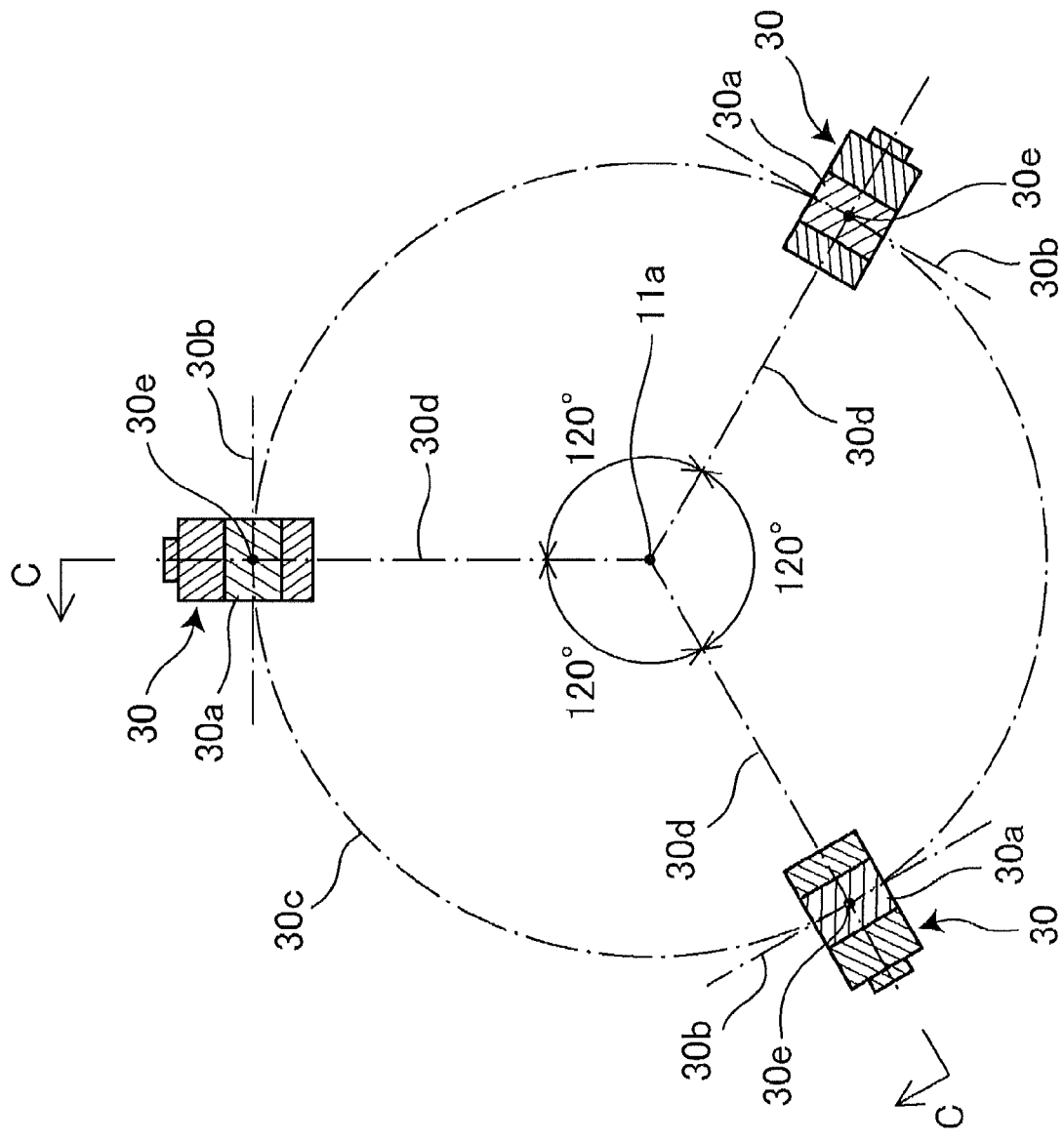
FIG. 4 is a cross-sectional view useful in explaining a plane A-A shown in FIG. 1.

Note that as shown in FIG. 4, the rotation clamping mechanism 1 according to the present embodiment is equipped with three engagement members 30, for example. The swinging axes 30b of the swinging shaft portions 30a of the respective engagement members 30 (see FIG. 3) are tangents on a same inscribed circle 30c that is centered on the rotational axis 11a of the rotating member 20. When the engagement members 30 swing, the trajectories (swinging planes) 30d traced by center planes in the width direction of the engagement members 30 are all perpendicular to the circumferential direction of the inscribed circle 30c, and pass tangent points between the swinging axes 30b and the inscribed circle 30c. That is, the three swinging planes 30d intersect at the position of the rotational axis 11a. In addition, the three engagement members 30 are disposed at equal intervals so that the three swinging planes 30d are disposed at 120° intervals. Note that although an example where the number of the engagement members 30 is three is given in the present embodiment, the number may be two or four or more.

Figure 5:
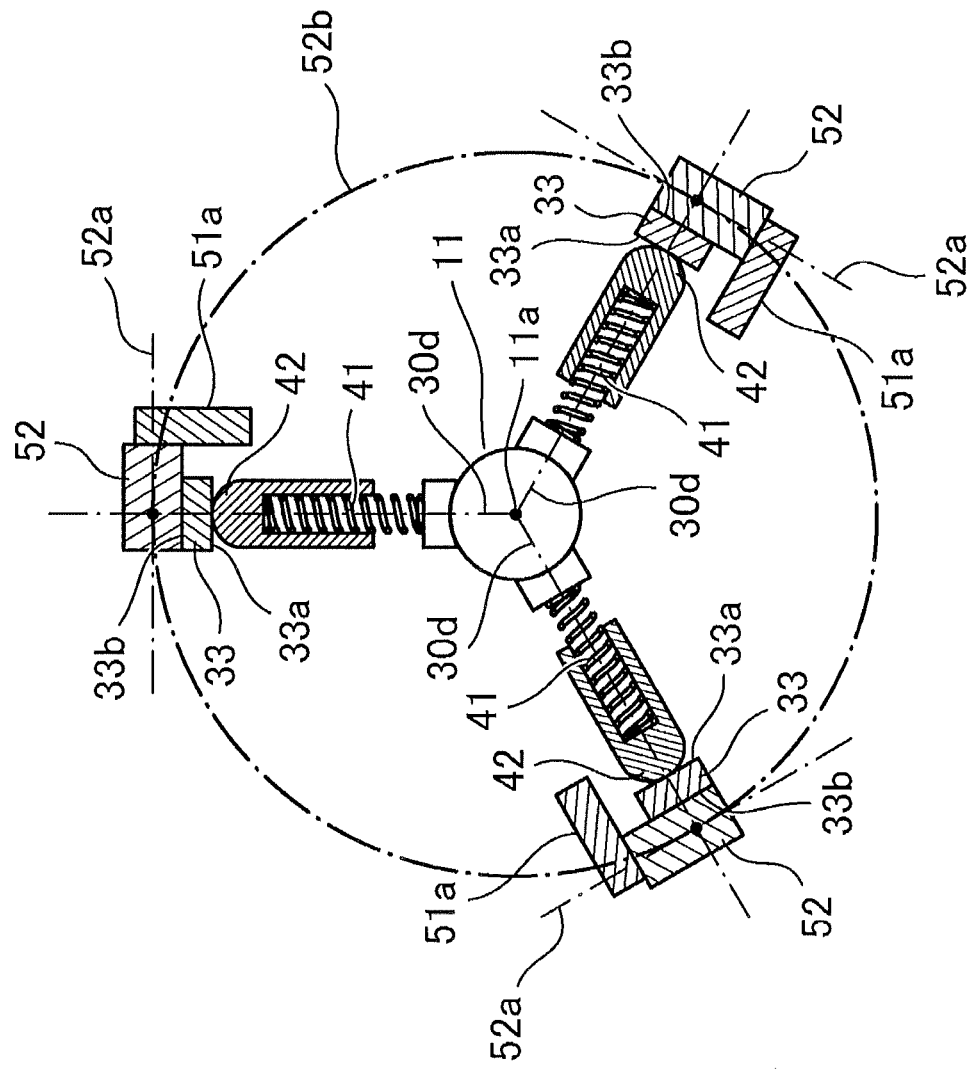
FIG. 5 is a cross-sectional view useful in explaining the entire rotation clamping mechanism and showing a plane B-B shown in FIG. 3B.

The biasing members 40 applies a biasing force to the engagement members 30 so as to bias the engagement members 30 in a direction so as to rotate toward the engagement position, and as shown in FIG. 5, one biasing member 40 is provided corresponding to each engagement member 30.

As shown in FIG. 1, each biasing member 40 is disposed between the rotational axis 11a and the tail portion 33 of an engagement member 30, and is equipped with a coil spring 41 and a head portion 42 attached to a front end portion of the spring 41.

As shown in FIG. 5, the spring 41 is a compression spring whose direction of extension/contraction is oriented in a radial direction perpendicular to the axial direction X of the rotational axis 11a of the rotating member 20 (a radial direction that extends toward the outside from the rotational axis 11a) and is in a state where the spring 41 is capable of extension. Each spring 41 is disposed so that the axis of extension/contraction that passes through the center of the spring 41 and extends in the direction of extension/contraction is positioned on the swinging plane 30d of the corresponding engagement member 30. That is, the swinging plane 30d of each engagement member 30 matches a plane formed by the rotational axis 11a of the rotating member 20 and the axis of extension/contraction of the spring 41 (the biasing direction of the biasing member). In this way, in the same way as the swinging planes 30d of the engagement members 30, the springs 41 are disposed at 120° intervals.

Also, each spring 41 contacts the rotating member 20 at a base end portion thereof (an end portion on the rotational axis side in the radial direction), contacts the head portion at the front end portion on the outside in the radial direction (see FIG. 1), and biases the head portion 42 toward the outside in the radial direction in keeping with extension of the spring 41.

The head portion 42 is a cylindrical body that is provided so as to cover the front end portion of the spring 41 that moves forward and backward and is attached to the spring 41. The head portion 42 also contacts the tail portion 33 of the engagement member 30 and a part of the head portion 42 that contacts the tail portion 33 is formed of a spherical portion. By applying a biasing force to the tail portion 33 of the engagement member 30 toward the outside in the radial direction, the biasing member 40 biases the engagement member 30 toward the engagement position.

As one example, each engagement member 30 at the release position (see FIG. 1) is in a state where the tail portion 33 is pressed onto the cam roller 52 by the biasing force. The engagement member 30 in such state is positioned at the release position in a state where the engagement member 30 is sandwiched between the biasing member 40 and the cam roller 52. On the other hand, the engagement member 30 (see FIG. 2) at the engagement position is in a state where the hook portion 31 is pressed against the drive plate B by the biasing force. At such time, the biasing force of the biasing member 40 acts as a force that keeps the hook portion 31 in the engagement state with the drive plate B.

Maintenance, such as replacement and removal, of the biasing members 40 according to the present embodiment is also simple. That is, in a state where an engine is not loaded at the test position, by merely removing the swinging shaft portions 30a of the engagement members 30 and removing the engagement members 30 from the rotating member 20, it is possible to easily remove the biasing members 40 to the outside in the radial direction.

Note that the distance D1 (see FIG. 2) from the swinging axis 30b to the contact position of the head portion 42 is shorter than the distance D2 from the swinging axis 30b to the hook portion 31. That is, the swinging shaft portion 30a is disposed so as to be offset from a midway position (an intermediate position) between the position of the hook portion 31 and the biasing position (i.e., the second contact position where the head portion 42 contacts the engagement member 30) toward such biasing position.

As shown in FIG. 1, the slider 50 includes a slider body 51 that is cylindrical and is attached to the outer circumference of the rotating member 20 and the cam rollers (pressing members) 52 installed on rib portions 51a on the front side (in the rotational axis direction) of the slider body 51. The rib portions 51a are provided so as to protrude outward in the radial direction from the slider body 51 and rotatably support the cam rollers 52.

The slider body 51 is disposed in a state so as to be slidable in the rotational axis direction X of the rotating member 20 and is moved forward and backward in the rotational axis direction X by an actuator (not shown).

As shown in FIG. 5, each of the cam rollers 52 is a member that constructs opening/closing mechanisms for the engagement members 30, with one cam roller 52 being provided corresponding to each engagement member 30. Each cam roller 52 moves forward and backward in the rotational axis direction X together with the slider body 51 when the slider body 51 is moved forward and backward, and is capable of moving forward and backward between a withdrawal position (see FIG. 2) when the cam rollers 52 have moved to the front Xa in the rotational axis direction X and a pressing position (see FIG. 1) when the cam rollers 52 have moved to the rear Xb.

Each cam roller 52 is a cylindrical member and the direction of the center axis (the center axis of the cylinder) 52a of each cam roller 52 matches the direction of the swinging axis 30b of the corresponding engagement member 30 (see FIGS. 3A to 3D, 4, and 5). The center axes 52a of the three cam rollers 52 are positioned on tangents of a same inscribed circle 52b that is centered on the rotational axis 11a of the rotating member 20.

Each cam roller 52 contacts the cam surface 33b of the tail portion 33 of the corresponding engagement member 30 in a slidable state and is disposed inside the cam groove 34. Note that the respective cam rollers 52 are disposed so that the center axes 52a thereof are positioned closer to the rotational axis that the position of the swinging axes 30b (see FIG. 1), and are disposed in a state that is perpendicular to the swinging planes 30d of the corresponding engagement members 30 (see FIG. 5).

However, as described above, each cam surface 33b is inclined so as to become increasingly close to the rotational axis 11a toward the front in the direction in which the cam rollers 52 move forward and backward (i.e., the rotational axis direction). Also, the tail portion 33 of the engagement member 30 is biased toward the outside in the radial direction (i.e., toward the engagement position) by the biasing member 40.

Accordingly, when the slider body 51 is moved forward toward the front Xa in the rotational axis direction X, as shown in FIGS. 3A to 3D, the cam rollers 52 move forward and at the same time, the engagement members 30 rotate toward the engagement position due to the action of the biasing force of the biasing members 40, with sliding contact being maintained between the cam surfaces 33b and the cam rollers 52. When the three engagement members 30 have reached the engagement position, the hook portions 31 of the engagement members 30 engage the drive plate B so that the drive plate B becomes clamped by the rotation clamping mechanism 1 (see FIG. 3C). After this, as the cam rollers 52 move further forward, the cam rollers 52 reach the withdrawal position where the cam rollers 52 are separated from the cam surfaces 33b (see FIG. 3D).

That is, the engagement members 30 are positioned in a state where the engagement members 30 are sandwiched by the cam rollers 52 and the biasing members 40 until the engagement members 30 reach the engagement position where the hook portions 31 engage the drive plate B. However, after the hook portions 31 have engaged the drive plate B, the state where the engagement members 30 are sandwiched between the members 40, 52 ends, and the hook portions 31 become pressed onto the drive plate B by reactive forces to both the biasing force of the biasing members 40 and the centrifugal force due to the weight of the biasing members 40.

When the slider body 51 is moved backward, the cam rollers 52 at the withdrawal position move backward and come into contact with the cam surfaces 33b of the engagement members 30 that are positioned at the engagement position (see FIG. 3C). That is, a state is produced where the engagement members 30 are sandwiched between the biasing members 40 and the cam rollers 52. If the cam rollers 52 move further backward, the hook portions 31 of the engagement members 30 become separated from the drive plate B and the engagement members 30 rotate toward the release position while compressing the springs 41 against the biasing forces of the biasing members 40 (see FIG. 3B). After this, when the cam rollers 52 reach the pressing position, the engagement members 30 reach the release position (see FIG. 3A).

In this way, with the rotation clamping mechanism 1 according to the present embodiment, the engagement members 30 are opened and closed using the cam rollers 52, the cam surfaces 33b, and the biasing members 40 described above, which construct opening/closing mechanisms for the engagement members 30.

Also, as described above, the engagement members 30 at the engagement position are in a state where the hook portions 31 are pressed onto the drive plate B and are not in a state where the engagement members 30 are positioned by being sandwiched between the biasing members 40 and the cam rollers 52. That is, even if there are positional fluctuations in the drive plate B that is the clamped object (due to the product precision and/or attachment precision), it will be possible for the engagement position of the engagement members 30 to fluctuate in keeping with such fluctuations. Putting this another way, the rotation clamping mechanism 1 that sandwiches the drive plate B using the three engagement members 30 positioned at the engagement position is a floating clamping mechanism that is capable of coping with positional fluctuations in the drive plate B. Accordingly, in a state where the engagement members 30 are positioned at the engagement position, the rotational force of the rotation clamping mechanism 1 is transmitted via the engagement members 30 to the drive plate B (that is, to the engine).

Since misalignment will also occur the respective engagement members 30 if the center of the rotational axis 11a of the rotating member 20 and the center C of the drive plate B are misaligned, vibration and the like will be produced for the rotation clamping mechanism 1 as the rotating member 20 rotates. However, since the engagement members 30 of the rotation clamping mechanism 1 are in a floating state, such vibration and the like will not be transmitted via the engagement members 30 to the drive plate B, that is, to the engine. That is, since any vibration caused by rotation will occur for only the engagement members 30 and such vibration will not be transmitted to the engine itself, there will be little increase in the inertia force of the vibrating body (the parts that vibrate), and conversely the vibration of the equipment as a whole will decrease, making it difficult for resonance to occur. As a result, there is an operational effect in that there is a reduction in noise during cold tests of an engine and a significant increase in the precision of various measurements.

Note that aside from the configuration described above, the configuration of the cold test apparatus is the same as a well-known construction, and therefore detailed description thereof is omitted here.

Next, the operation of the rotation clamping mechanism 1 of the cold test apparatus described above will be described.

Note that the operation of the rotation clamping mechanism 1 will be described with a state where the engagement members 30 are positioned at the release position and the cam rollers 52 are positioned at the pressing position (see FIG. 1) as the starting point.

First, in a state where the engagement member 30 is positioned at the release position, the engine to be tested is loaded and placed at the predetermined test position. At this time, the engine is loaded so that the center C of the drive plate B and the rotational axis 11a of the rotating member 20 of the rotation clamping mechanism 1 are as closely aligned as possible.

Next, the actuator is driven to move the slider body 51 forward and thereby move the cam rollers 52 forward. At this time, the engagement members 30 are pressed by the biasing force of the biasing members 40 and rotate to the engagement position and the hook portions 31 of the engagement members 30 contact and engage the drive plate B of the engine. That is, the drive plate B becomes clamped by the three engagement members 30.

In addition, once the cam rollers 52 are moved further forward, the cam rollers 52 move to the withdrawal position where the cam rollers 52 are separated from the cam surfaces 33b of the engagement members 30.

By driving a motor to rotate the rotating member 20 in this state, the drive plate B is rotated to carry out a cold test of the engine.

However, when an engine is placed at the test position, it is not always easy to place the center C of the drive plate B of the engine in perfect alignment with the rotational axis 11a of the rotating member 20 of the rotation clamping mechanism 1, that is, to position the drive plate B (see FIG. 6A) at the position of the circle Bb drawn with a dot-dot-dash line.

If the hook portions 31a, 31b, 31c of the three engagement members 30 engage the drive plate B in a state where there is misalignment between the axes (see FIG. 6A), there will be variation in the distance from the rotational axis 11a of the rotating member 20 to the positions (engagement positions) of the hook portions 31a, 31b, 31c that engage the drive plate B. Also, if a driving operation where the rotating member 20 is rotated to rotate the drive plate B is carried out in a state where there is misalignment between the axes, during the driving operation the positions of the hook portions 31a, 31b, 31c will change from moment to moment in the direction of the swinging planes 30d.

Figure 6A:
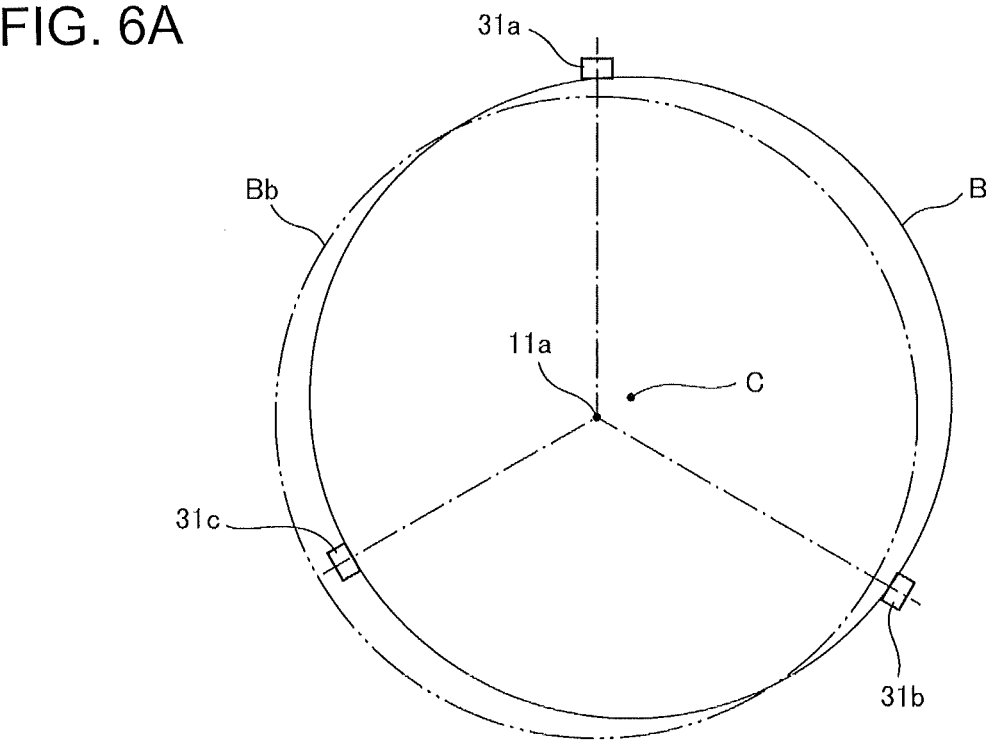
FIGS. 6A and 6B are diagrams useful in explaining the operation of the rotation clamping mechanism according to the present embodiment.
Figure 6B:
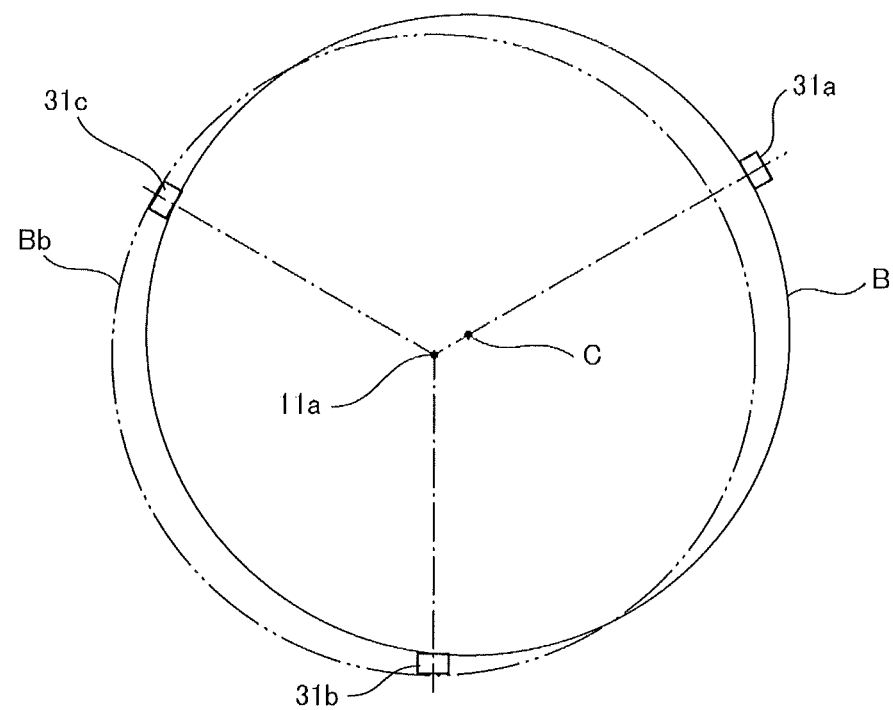

In FIGS. 6A and 6B, individual reference numerals 31a, 31b, 31c have been assigned to the respective hook portions 31, with FIG. 6B showing a state that has been rotated by 60° from the state in FIG. 6A. Although the respective hook portions 31a, 31b, 31c would rotate along the dot-dot-dash line if there were no misalignment between the axes, after rotating by 60° the hook portion 31a for example shown in FIG. 6A swings to a position that is even further separated from the position shown by the dot-dot-dash line (see FIG. 6B). That is, the respective engagement members 30 will swing during a driving operation.

If the engagement members 30 swing during a driving operation, there is the risk of vibration being produced by the hook portions 31 shaking at the contact positions (the first contact positions) between the hook portions 31 and the drive plate B and/or vibration being produced due to the swinging of the engagement members 30. If such vibration were transmitted to the drive plate B, resulting in the engine vibrating, there is the risk that this would adversely affect the cold test.

For this reason, the rotation clamping mechanism 1 of the present embodiment minimizes the generation of vibration as described below. Accordingly, with a cold test apparatus that uses the rotation clamping mechanism 1 according to the present embodiment, the vibration transmitted to the rotated object during a cold test is minimized and it is possible to carry out more accurate cold tests for an engine to be tested.

For example, the three engagement members 30 positioned at the engagement position clamp the drive plate B in a floating state as described above. Accordingly, during a driving operation of the drive plate B by the rotation clamping mechanism 1, the respective engagement members 30 can independently follow the drive plate B and the clamping force (i.e., the reactive forces to both the biasing force of the biasing members 40 and the centrifugal forces due to the weight of the biasing members 40) of the respective hook portions 31 can always be kept constant (or substantially constant). This means that the clamping state is maintained without the clamping of the drive plate B by the respective engagement members 30 being influenced by vibration or the like of the engagement members 30. Accordingly, shaking at the contact positions between the hook portions 31 and the drive plate B is prevented.

In particular, with the present embodiment, when the drive plate B is clamped by the engagement members 30, the drive plate B is clamped with the engagement members 30 in a floating state where the cam rollers 52 are separated from the cam surfaces 33b of the engagement members 30 at the engagement position, which means that during a cold test, it is possible to drastically reduce the transmission of vibration of predetermined frequencies that accompany rotation of the rotating member 20 to the engagement members 30. At such time, the engagement members 30 apply only rotational forces and clamping forces to the drive plate B. In other words, only rotational forces and biasing forces for clamping are transmitted via the engagement members 30 to the drive plate B and there is no transmission of vibration frequencies that accompany rotation of the rotating member 20.

Also, the extension/contraction direction (the biasing direction of the biasing member) of each spring 41 of the biasing members 40 is a direction perpendicular to the axial direction of the rotational axis 11a of the rotating member 20 and a direction along a swinging plane 30d (see FIG. 5). In other words, the biasing members 40 are disposed so that the orientation of the biasing forces of the biasing members 40 are oriented along the swinging planes 30d. With this construction, due to the biasing forces applied to the engagement members 30, there is no generation of component forces in directions perpendicular to the swinging planes 30d, so that the generation of vibration due to such component forces (vibration forward and backward in the axial direction) is prevented.

Also, the position of the swinging axis 30b of the engagement member 30 is disposed so as to be offset from a midway position (an intermediate position) between the position of the hook portion 31 and the contact position (a second contact position) of the head portion 42 on the biasing member 40 toward the biasing position. If the drive plate B is rotated in a state where there is misalignment between the center of the rotational axis 11a of the rotating member 20 and the center C of the drive plate B, the respective engagement members 30 will swing with different swinging phases when the rotating member 20 rotates, resulting in the risk of the center of gravity of the entire rotating part of the rotation clamping mechanism 1 fluctuating, which would cause vibration. For this reason, if the position of the swinging axis 30b of the engagement member 30 is disposed with the offset described above, the biasing position will fluctuate less than the fluctuation in the position of the hook portion 31 and there will be less fluctuation in the extension and contraction of the biasing member 40. It also becomes possible to reduce the length and size of the tail portion 33 of the engagement member 30. If it is possible to reduce the fluctuation in the extension and contraction of the biasing member 40 and to reduce the size of the tail portion 33, it will be possible to reliably reduce the fluctuation in the center of gravity of the rotating part of the rotation clamping mechanism 1, and the generation of vibration due to fluctuation in the center of gravity will be minimized. Note that even if the center of the rotational axis 11a matches the center C of the drive plate B are aligned, there are cases where the distance from the center C to the clamping positions of the respective engagement members 30 will fluctuate due to problems with the product precision of the drive plate B. It should be obvious that the rotation clamping mechanism according to the present invention is also effective in such case.

Also, each biasing member 40 is disposed so that the biasing position (the contact position between the biasing member 40 and the biasing surface 33a of the tail portion 33 of the corresponding engagement member 30) is disposed closer to the rotational axis 11a of the rotating member 20 than the position of the swinging axis 30b. In this way, if each biasing member 40 is disposed at a position close to the rotational axis 11a, the configuration of the entire rotating member will be disposed at a position close to the rotational axis, which makes the rotating member 20 more compact and also lighter. Since the weight of the rotating member 20 is reduced, the inertia moment of the rotating member 20 is also reduced.

Note that the rotation clamping mechanism according to the present invention is not limited to the mechanism in the embodiment described above. Mechanisms that have been modified within a range that does not depart from the scope of the present invention are also included in the range of the present invention.

For example, although the tail portion 33 of each engagement member 30 according to the present embodiment is constructed so as to include the cam groove 34 that is engaged by the cam roller 52, if a cam surface 33b with which the cam roller 52 can make sliding contact is formed, it is possible to use a construction that does not include the cam groove 34.

What is claimed is:

1. A rotation clamping mechanism comprising:
   a rotating member installed so as to be capable of being rotationally driven; and
   at least two engagement members that are attached to the rotating member and transmit rotational power,
   wherein the engagement members are placed in engagement with a rotated object placed at a power transmission implementation position, which is in a predetermined positional relationship with the engagement member,
   the rotated object is rotated by rotating the rotating member,
   the engagement members are supported on the rotating member in state where the engagement members are capable of swinging to an engagement position with the rotated object to transmit power to the rotated object and to a release position where the engagement is released,
   the rotation clamping mechanism further comprises: an opening/closing mechanism that opens and closes the engagement members between the engagement position and the release position; and biasing members that each biases one of the engagement members toward the engagement position,
   the opening/closing mechanism comprises: a cylindrical slider body that is attached to the outer circumference of the rotating member and that is moved forward and backward in a direction along a rotational axis of the rotating member; and pressing members installed on the cylindrical slider body,
   when the cylindrical slider body is moved backward, each of the pressing members contacts a corresponding one of the engagement members and moves a tail portion of the corresponding one of the engagement members radially inward toward a corresponding biasing member to position the corresponding one of the engagement members at the release position,
   when the cylindrical slider body is moved forward, each of the pressing members moves away from the corresponding biasing member and is positioned at a withdrawal position where each pressing member does not hold the corresponding one of the engagement members, and
   when the pressing members are at the withdrawal position, each of the engagement members is swingably pressed onto the rotated object by the corresponding biasing member so that the engagement members are positioned at the engagement position where the engagement members clamp the rotated object and are in a floating state in which vibration from the rotating member is not transmitted to the rotated object.

2. A rotation clamping mechanism according to claim 1, wherein a biasing direction of the biasing members is a direction perpendicular to an axial direction of the rotational axis of the rotating member, and a swinging plane of each of the engagement members is a plane formed by the biasing direction of a biasing force applied to each of the engagement members and the axial direction of the rotational axis.

3. A rotation clamping mechanism according to claim 2, wherein a swinging axis position of each engagement member is a midway position between a first contact position of the engagement member on the rotated object and a second contact position of the corresponding biasing member on the engagement member, and is disposed so as to be offset from an intermediate position that is equidistant from the first contact position and the second contact position.

4. A rotation clamping mechanism according to claim 3, wherein the second contact position is closer to the rotational axis than the swinging axis position of the engagement member.

5. A rotation clamping mechanism according to claim 1, wherein each of the pressing members slidably contacts a sliding surface of the corresponding one of the engagement members,
   each of the pressing members applies a pressing force that resists a biasing force of the corresponding biasing member to the corresponding one of the engagement members and is capable of moving between a pressing position that positions the corresponding one of the engagement members at the release position and the withdrawal position where the pressing member is separated from the corresponding one of engagement members, and
   the engagement members positioned at the engagement position are pressed onto the rotated object in the floating state by the biasing force of the biasing members.

6. A rotation test apparatus for an internal combustion engine, comprising a rotation clamping mechanism that rotates a drive plate of the internal combustion engine loaded at a predetermined position,
   the rotation clamping mechanism comprising: a rotating member installed so as to be capable of being rotationally driven; and at least two engagement members that are attached to the rotating member,
   wherein the engagement members transmit rotational power from the rotating member to the drive plate, the engagement members are supported on the rotating member in state where the engagement members are capable of swinging to an engagement position with the rotated object to transmit power to the drive plate and to a release position where the engagement is released, the rotation test apparatus is configured so that the drive plate rotates when the engagement members are placed in engagement with the drive plate and the rotating member is rotated, the rotation clamping mechanism further includes: an opening/closing mechanism that opens and closes the engagement members between the engagement position and the release position; and biasing members that each biases one of the engagement members toward the engagement position, and the opening/closing mechanism comprises: a cylindrical slider body that is attached to the outer circumference of the rotating member and that is moved forward and backward in a direction along a rotational axis of the rotating member; and pressing members installed on the cylindrical slider body, when the cylindrical slider body is moved backward, each of the pressing members contacts a corresponding one of the engagement members and moves a tail portion of the corresponding one of the engagement members radially inward toward a corresponding biasing member to position the corresponding one of the engagement members at the release position, when the cylindrical slider body is moved forward, each of the pressing members moves away from the corresponding biasing member and is positioned at a withdrawal position where each pressing member does not hold the corresponding one of the engagement members, and when the pressing members are at the withdrawal position, each of the engagement members is swingably pressed onto the rotated object by the corresponding biasing member so that the engagement members are positioned at the engagement position where the engagement members clamp the drive plate and are in a floating state in which vibration from the rotating member is not transmitted to the rotated object.

7. A rotation test apparatus for an internal combustion engine according to claim 6, wherein a biasing direction of the biasing members is a direction perpendicular to an axial direction of the rotational axis of the rotating member, and a swinging plane of each of the engagement members is a plane formed by the biasing direction of a biasing force applied to each of the engagement members and the axial direction of the rotational axis.

8. A rotation test apparatus for an internal combustion engine according to claim 6, wherein each of the pressing members slidably contacts a sliding surface of the corresponding one of the engagement members, each of the pressing members applies a pressing force that resists a biasing force of the corresponding biasing member to the corresponding one of the engagement members and is capable of moving between a pressing position that positions the corresponding one of the engagement members at the release position and the withdrawal position where the pressing member is separated from the corresponding one of engagement members, and the engagement members positioned at the engagement position are pressed onto the drive plate in the floating state by the biasing force of the biasing members.

9. A rotation test apparatus for an internal combustion engine according to claim 6, wherein a swinging axis position of each engagement member is a midway position between a first contact position of the engagement member on the drive plate and a second contact position of the corresponding biasing member on the engagement member, and is disposed so as to be offset from an intermediate position that is equidistant from the first contact position and the second contact position.

10. A rotation test apparatus for an internal combustion engine according to claim 6, wherein the second contact position is closer to the rotational axis than the swinging axis position of the engagement member.

* * * * *